(12) United States Patent
Boyd et al.

(10) Patent No.: US 12,015,652 B2
(45) Date of Patent: Jun. 18, 2024

(54) WEB CALLING SYSTEM

(71) Applicant: Snap Inc., Santa Monica, CA (US)

(72) Inventors: Nathan Kenneth Boyd, Los Angeles, CA (US); Laurent Desserrey, Los Angeles, CA (US); Alex Edelsburg, Seattle, WA (US); Benjamin Ralph Hollis, Seattle, WA (US); David Paliwoda, London (GB); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 75 days.

(21) Appl. No.: 17/655,307

(22) Filed: Mar. 17, 2022

(65) Prior Publication Data

US 2023/0300176 A1    Sep. 21, 2023

(51) Int. Cl.
*H04L 65/1059* (2022.01)
*G06F 3/0484* (2022.01)
*H04L 65/75* (2022.01)

(52) U.S. Cl.
CPC ........ *H04L 65/1059* (2013.01); *G06F 3/0484* (2013.01); *H04L 65/75* (2022.05)

(58) Field of Classification Search
CPC .... H04L 65/1059; H04L 65/75; G06F 3/0484
See application file for complete search history.

(56) References Cited

U.S. PATENT DOCUMENTS

| | | | |
|---|---|---|---|
| 9,503,680 B1 | 11/2016 | O'connor et al. | |
| 11,562,657 B1* | 1/2023 | Fieldman | G09B 5/14 |
| 2021/0099675 A1 | 4/2021 | Eirinberg et al. | |
| 2021/0192852 A1 | 6/2021 | Holmes | |
| 2021/0297461 A1* | 9/2021 | Athwal | G06Q 20/22 |
| 2023/0007189 A1* | 1/2023 | Balaji | H04N 7/147 |

FOREIGN PATENT DOCUMENTS

EP      3846455        7/2021
WO    WO-2023177711 A1    9/2023

OTHER PUBLICATIONS

"International Application Serial No. PCT/US2023/015256, International Search Report dated Jul. 6, 2023", 3 pgs.
"International Application Serial No. PCT/US2023/015256, Written Opinion dated Jul. 6, 2023", 7 pgs.

* cited by examiner

*Primary Examiner* — Olisa Anwah
(74) *Attorney, Agent, or Firm* — Schwegman Lundberg & Woessner, P.A.

(57) ABSTRACT

A web calling client that enhances video conferencing is described. The web calling client is provided by a messaging system that facilitates exchanging data over a network. The web calling client is launched in a web browser of a user device to display a user interface that includes an output of a digital image sensor of a camera. The web calling client is configured to provide augmented reality experiences provided by the messaging system.

16 Claims, 14 Drawing Sheets

WEB CALLING SYSTEM

TECHNICAL FIELD

The present disclosure relates generally to facilitating interactions between user devices over a network.

BACKGROUND

As the popularity of computer-implemented tools that permit users to access and interact with content and other users online continues to grow, various computer-implemented tools are being developed to permit users to interact and share content with other users through messaging applications. For example, a messaging system may host a backend service for an associated messaging client that is configured to permit users to interact asynchronously via messages and, also, synchronously via audio and video calling. A messaging client may be provided by the messaging system in the form of a native application that executes in a mobile operating system on a smartphone, for example.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

The methodology described herein improves the functionality of electronic messaging software and systems by enhancing the experience of users that are making and receiving video calls at their computers. Video teleconferencing software programs can be accessed at a computer that is typically used for office or school work, such as a desktop or a laptop. Some existing video teleconferencing software programs provide only limited video options. For example, the video teleconferencing software programs often require a number of selections to be made by a user, including a selection to initiate or answer a call with a video, before the output of the digital sensor of the camera is displayed on the screen of the computer. The user thus is not able to make an assessment of how they may look to the other party of the video call prior to being actually seen by the other party.

The technical problem of streamlining a video calling launch process in a manner that permits a user to make an assessment of how they may look to the other party of the video call prior to being actually seen by the other party is addressed by configuring a messaging system to provide a messaging client that can be accessed from a web browser. A messaging client that can be accessed from a web browser is referred to as a web calling client and the components of the messaging system that participate in facilitating web calling are referred to as a web calling system, for the purposes of this description. The web calling client, in some examples, is a single-page web application (SPA) built as a progressive web application (PWA). A PWA is a website that loads up an application, which is executing predominantly in the client browser, while being installable at the user device system so it is represented in the desktop view of the associated operating system by an icon, and the code and data for the PWA are available even when the user is offline. The messaging system may provide, in addition to the web calling client, a messaging client in the form of a native application. The messaging system permits videoconferencing between the web calling client and the messaging client in the form of the native application on another computing device. Users are represented by respective user profiles in the messaging system. A user who is logged into the web calling client is permitted to initiate or join a video call session with another user who is logged into the native application executing at their mobile computing device.

Figure 5:
FIG. 5 illustrates a web calling user interface, in accordance with some examples.
Figure 5:
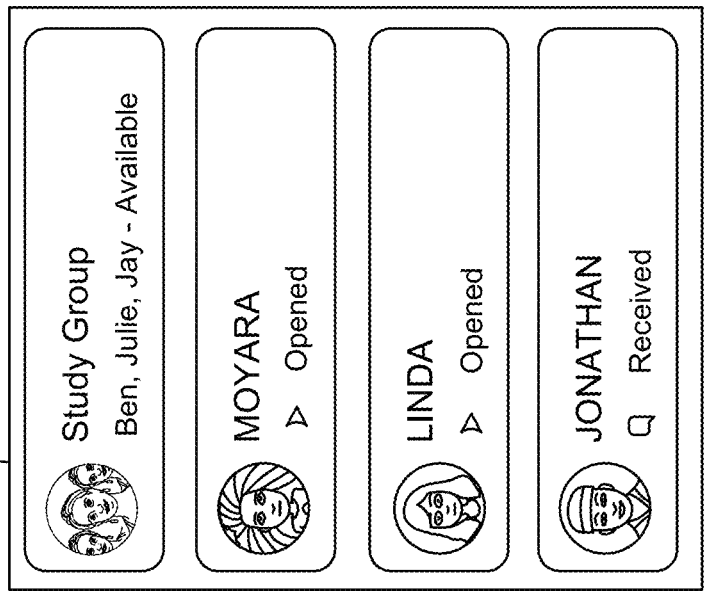
Figure 5:

In some examples, the web calling client is launched to a web calling user interface (UI) that includes an output of a digital image sensor of the camera of the user device in an area referred to as a video feed area. An example web calling UI is illustrated in FIG. 5, which is described below. The web calling UI may also display a contacts panel that includes information identifying users that can be engaged in a video call, and a user-selectable element actionable to initiate a video call process in the web browser. The user-selectable element actionable to initiate a video call process is referred to as a new call element, for the purposes of this description. In some examples, the web calling system is configured to blur the video feed area in response to inactivity (e.g., if no activity with respect to initiating or accepting a video call has been detected after a predetermined period of time) and/or in response to detecting that the foreground focus has been removed from the web calling UI.

Figure 6:
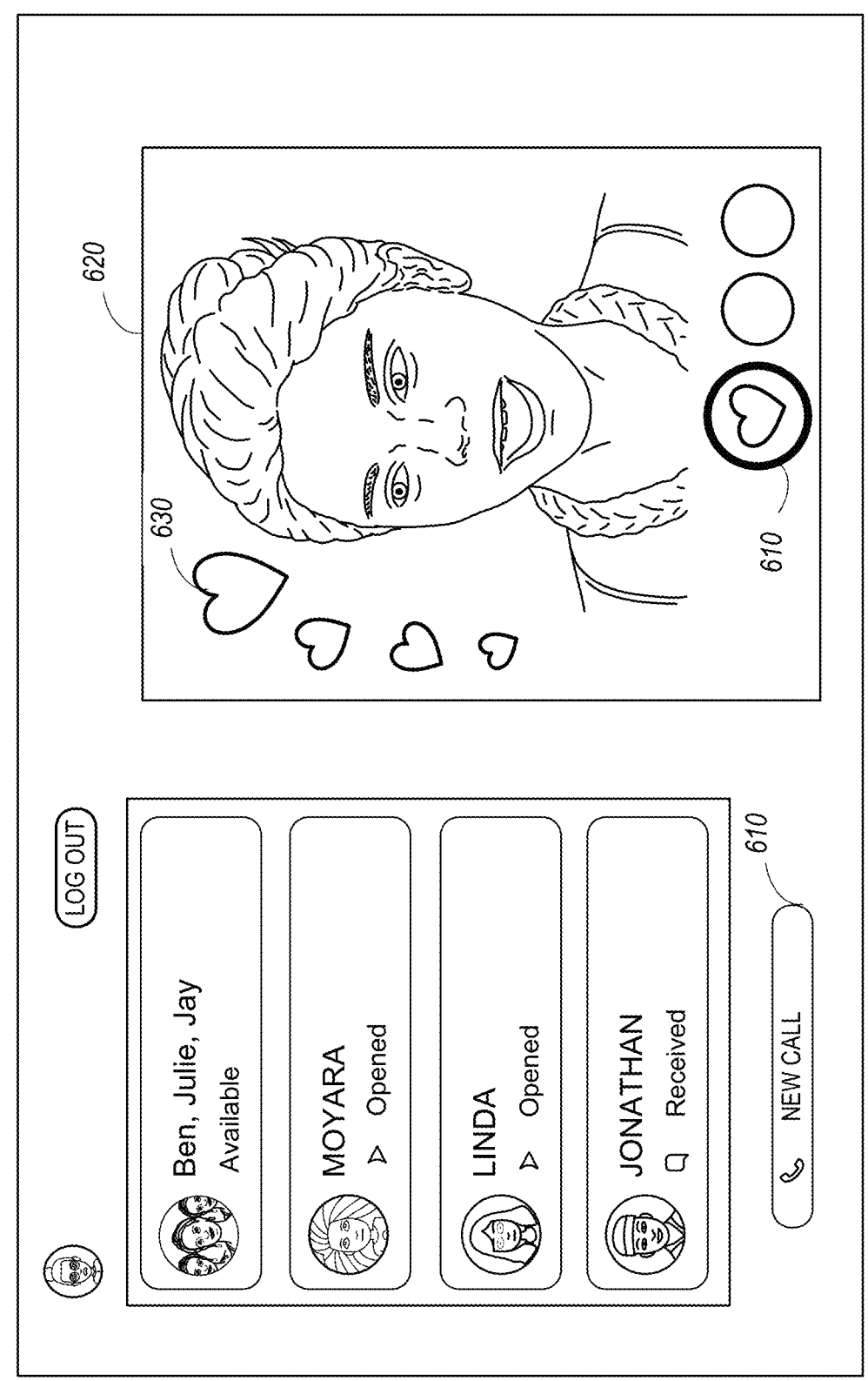
FIG. 6 illustrates a user interface that permits user access to an augmented reality experience, in accordance with some examples.

In some examples, the web calling system provides a user with access to augmented reality (AR) components provided by the messaging system. As will be described in more detail below, AR components can be used to modify an area of a UI, such as, for example, an area displaying the output of the digital sensor of a camera (the video feed area), by overlaying images and/or animation on top of the video feed area, or by adding three-dimensional (3D) effects, objects, characters, and transformations. In one example, access to one or more AR components are provided to a user in response to a detected action with respect to the area in the associated UI that includes the output of the digital image sensor of the camera. For example, such action may be a hover action with respect to the video feed area, which is positioning a cursor over the video feed area. An example illustrating an AR experience provided by the web calling client, which could be accessed from the web calling UI, is shown in FIG. 6, which is described below. Access to AR experiences may be provided from other UIs generated by the messaging system that include an area for displaying an output of a digital image sensor of the camera, such as, for example, from a new call UI.

When a user lands on the web calling client with their camera open, (such as when the video feed area displays the output of the digital image sensor of the camera) the user is permitted to capture the moment by capturing said output, selectively augmenting the captured image or video using an AR component provided by the messaging system. The user can then d send the captured content to another user of the messaging system.

Figure 7:
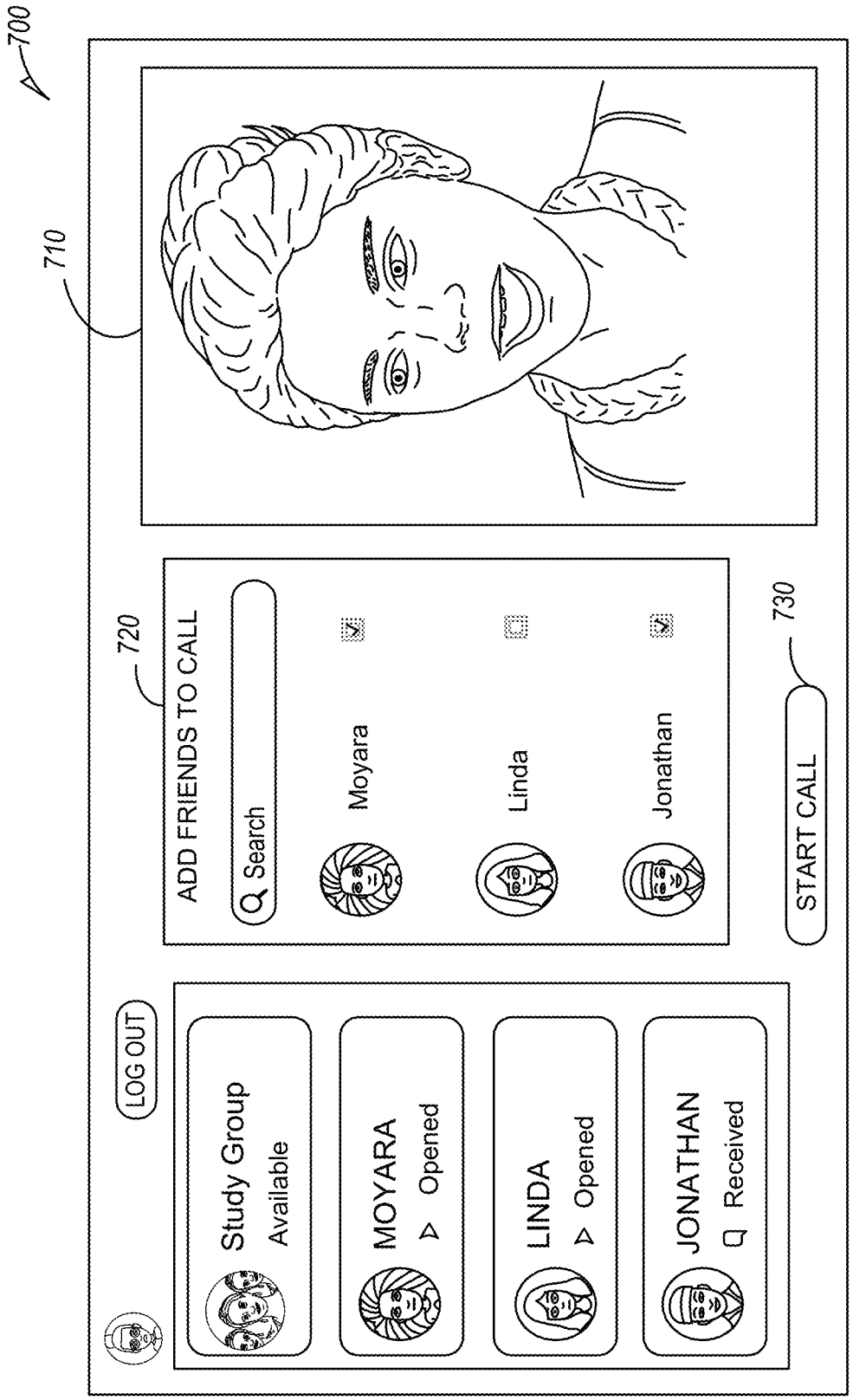
FIG. 7 illustrates a new call user interface, in accordance with some examples.
Figure 8:
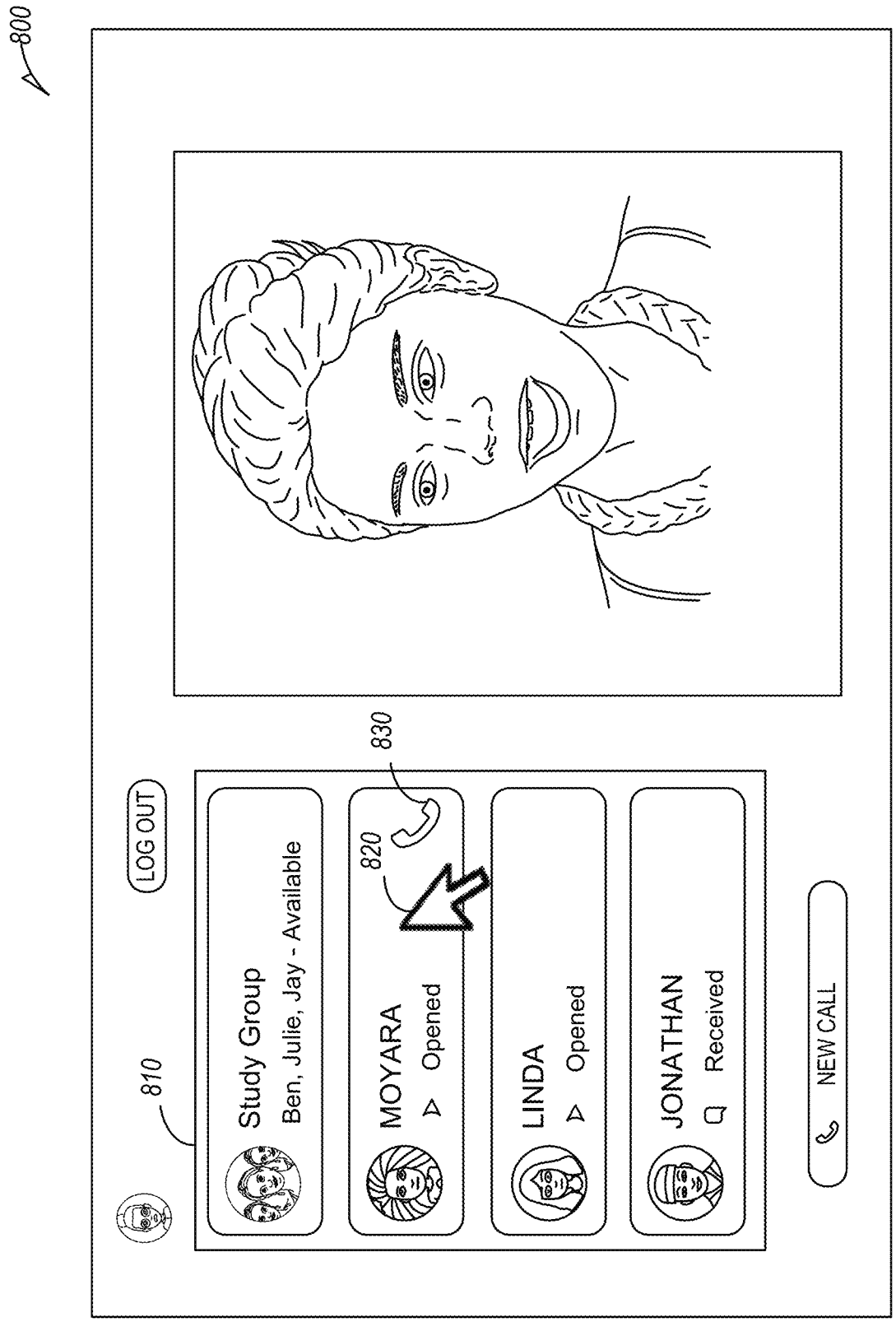
FIG. 8 illustrates surfacing a start call user-selectable element from the web calling user interface, in accordance with some examples.
Figure 9:
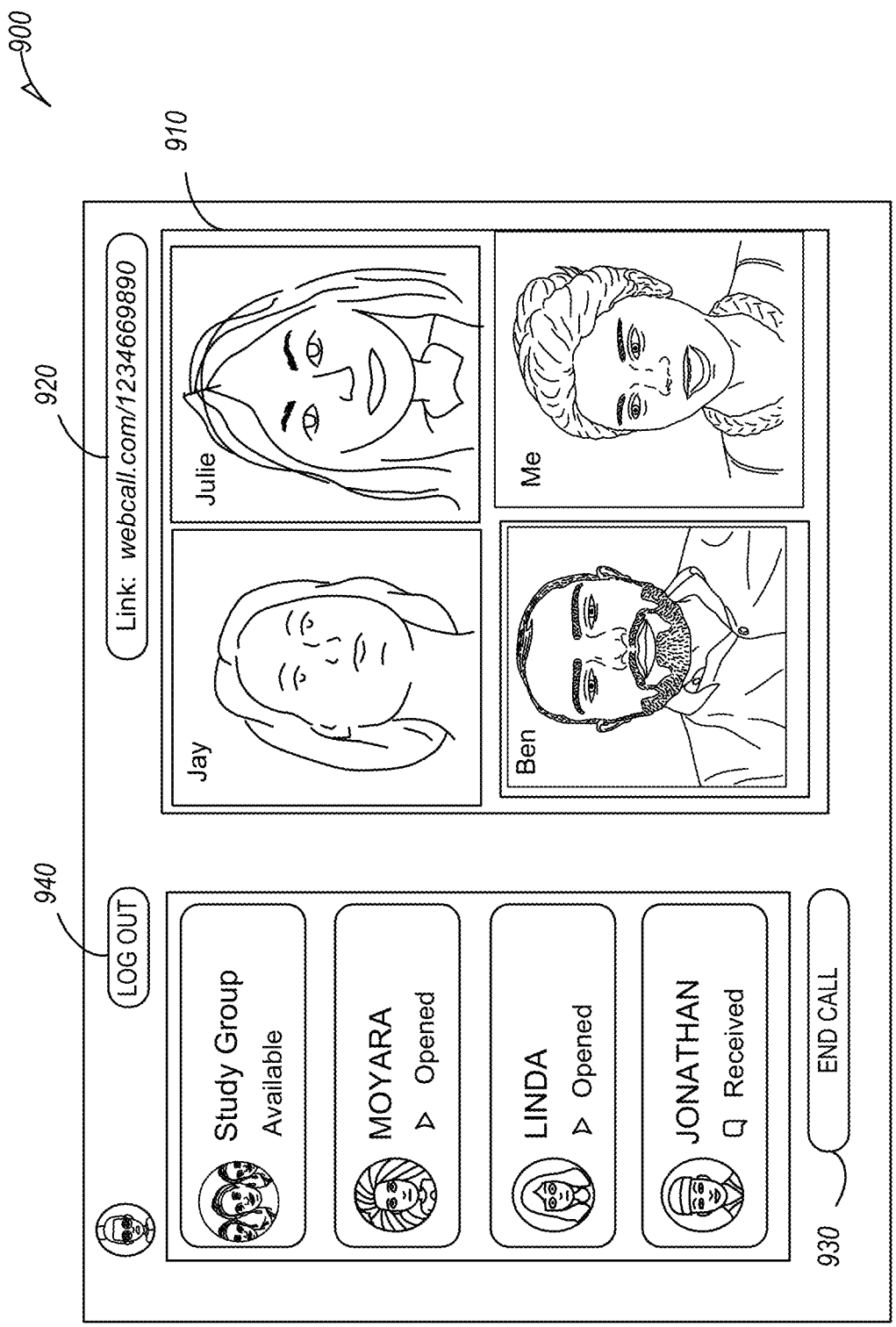
FIG. 9 illustrates a call session user interface, in accordance with some examples.

The new call UI is generated by the web calling system in response to detecting activation of the new call element. An example new call UI is shown in FIG. 7, which is described below. In some examples, the new call UI includes the video feed area, a call recipient selection area comprising references to respective contacts that can be selected as invitees for a video call, and a start call user-selectable element. A video call session with the selected contacts can be initiated by engaging the start call user-selectable element. In some examples, a video call session is initiated directly from the web calling UI. The web calling UI includes a contacts panel area that displays references to contacts of the user. The web calling system is configured to detect an action with respect to a reference to a contact in the contacts panel area and, in response, cause display of a call user-selectable element in proximity to the reference. An example of the call user-selectable element displayed in proximity to a reference in the contacts panel area is shown in FIG. 8 and described below. For a video call session between two or more participants, the web calling system generates a video call UI, which is illustrated in FIG. 9 and described below. In some examples, the web calling system is configured to permit a participant of a video call session to share their screen with other participants.

Networked Computing Environment

Figure 1:
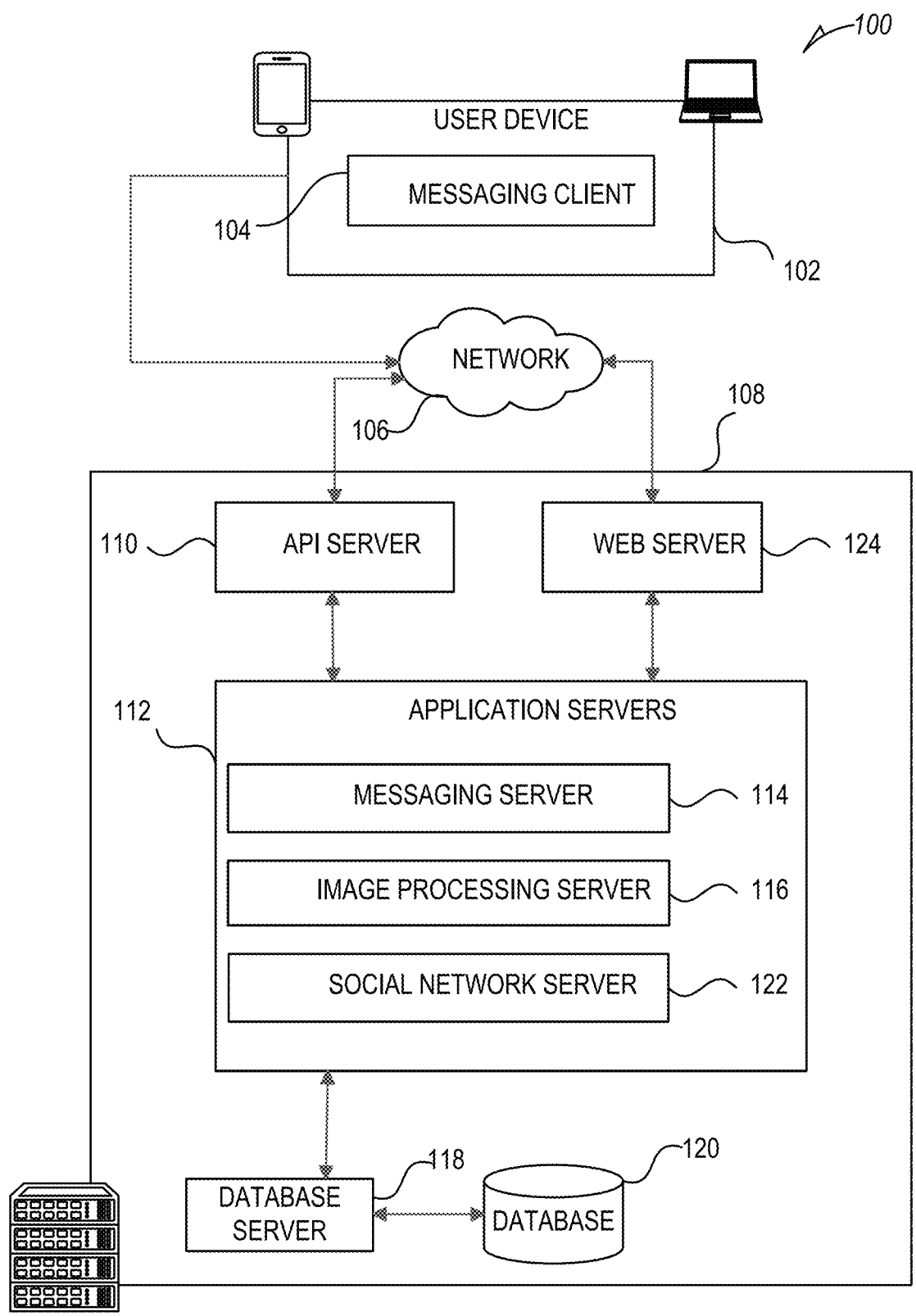
FIG. 1 is a diagrammatic representation of a networked environment in which a web calling system may be deployed, in accordance with some examples.

FIG. 1 is a block diagram 100 showing an example messaging system for exchanging data (e.g., messages and associated content) over a network. The messaging system includes multiple instances of a messaging client 104 executing at respective user devices such as a user device 102 and a messaging server system 108. Each messaging client 104 is communicatively coupled to other instances of the messaging client 104 and a messaging server system 108 via a network 106 (e.g., the Internet). The messaging client 104 may be in the form of a web calling client accessible from a web browser provided at the user device 102, for example where the user device 102 is a desktop or a laptop computer. The messaging client 104 may also be in the form of a native application that executes in a mobile operating system, for example where the user device 102 is a smartphone, for example.

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a user device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, user device information, geolocation information, media augmentation and overlays, message content persistence conditions, social network information, live event information, as well as images and video captured with a front facing camera of an associated user device using customized image reprocessing. Data exchanges within the messaging system are invoked and controlled through functions available via user interfaces (UIs) of the messaging client 104. The messaging client 104 in the form of a web calling client causes presentation of a web calling UI that includes a video feed area to display an output of a digital image sensor of a camera of the user device 102 and a new call user-selectable element actionable to initiate a video call process in the associated web browser. An example web calling UI is illustrated in FIG. 5 and described below.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the user device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a user device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, which can be hosted or supported by the image processing server 116.

Figure 3:
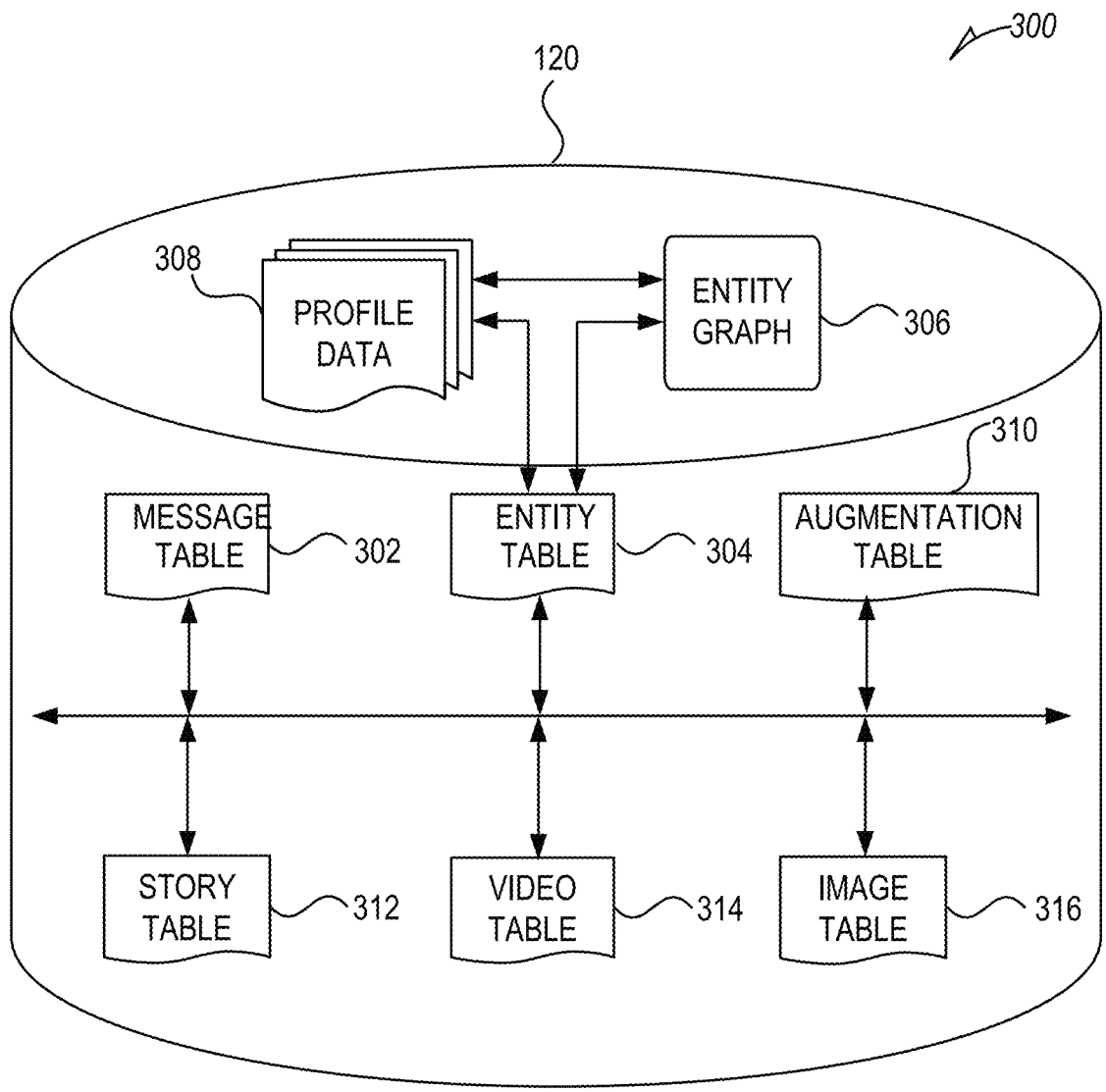
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system with which a particular user has a "friend" relationship or is "following," and also the identification of other entities and interests of a particular user.

System Architecture

Figure 2:
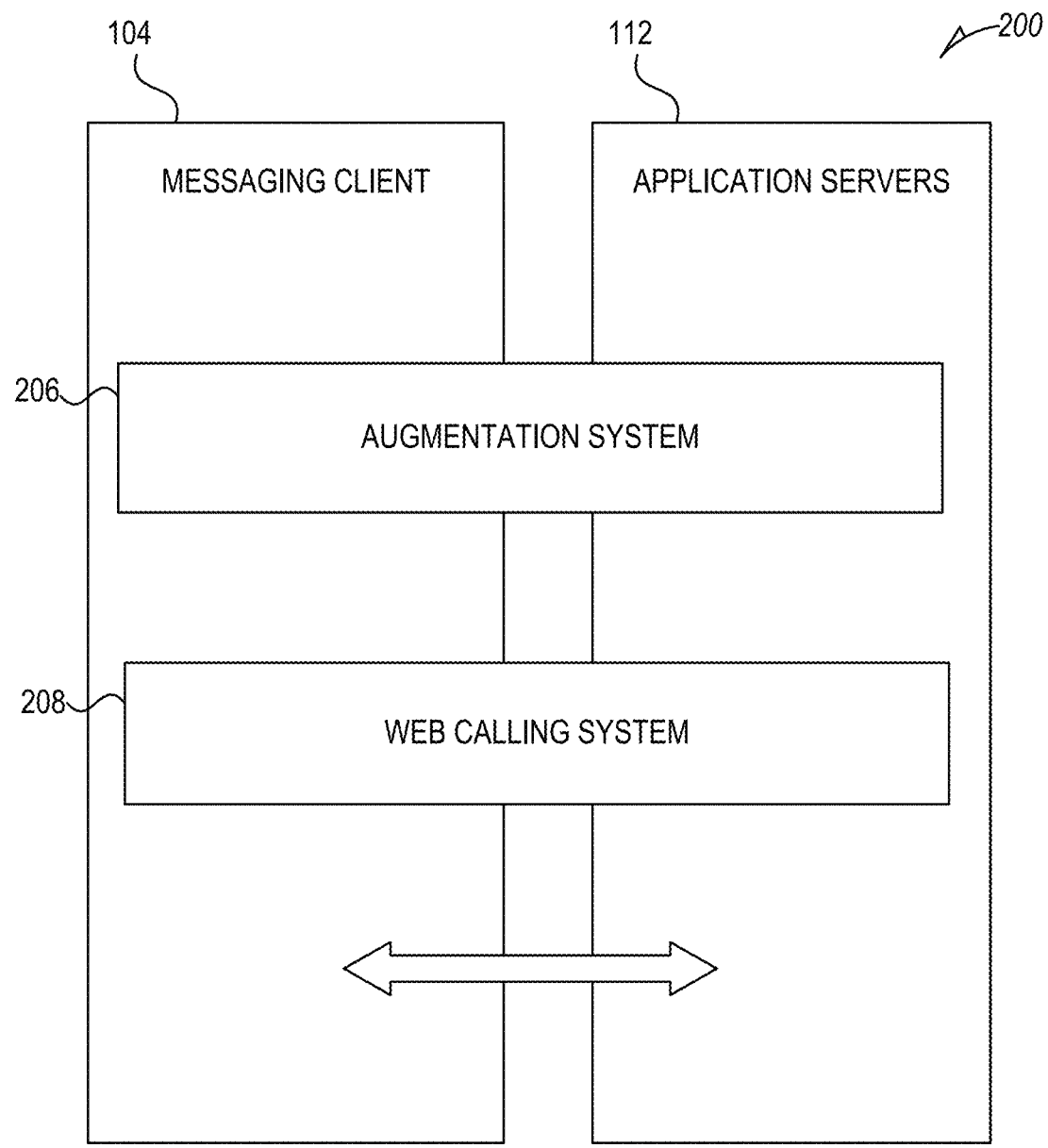
FIG. 2 is a diagrammatic representation of a messaging system, in accordance with some examples, that has both client-side and server-side functionality, and that includes a web calling system.

FIG. 2 is a block diagram 200 illustrating further details regarding the messaging system, according to some examples. Specifically, the messaging system is shown to comprise the messaging client 104 and the application servers 112. The messaging system embodies a number of subsystems, which are supported on the client-side by the messaging client 104, and on the sever-side by the application servers 112. These subsystems include, for example, an augmentation system 206 and a web calling system 208.

The web calling system 208 is configured to detect or receive a request to launch a web calling client in a web browser at a user device and, in response, generate a web calling UI. As mentioned above, the web calling UI includes a video feed area to display an output of a digital image sensor of a camera of the user device 102 and a new call user-selectable element actionable to initiate a video call process in the associated web browser. The web calling system 208 causes display of the web calling UI at the user device 102. In some examples, the web calling system 208 permits a user to access AR experiences provided by the augmentation system 206, as is described below with reference to FIG. 6.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system. The media overlays may be stored in the database 120 and accessed through the database server 118.

In some examples, the augmentation system 206 is configured to provide access to AR components that can be implemented using a programming language suitable for application development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some examples, an AR component includes modules configured to modify or transform image data presented within a graphical user interface (GUI) of a user device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a user device and then displayed on a screen of the user device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. For example, some embodiments may involve generating a 3D mesh model of the object or objects, and using transformations and animated textures of the model within the video to achieve the transformation. In other examples, tracking of points on an object may be used to place an image or texture, which may be two dimensional or three dimensional, at the tracked position. In still further examples, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. As explained above, users in the messaging system are represented by respective profiles storing information pertaining to the associated users. The profile data 308 may be selectively used and presented to other users of the messaging system, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). The profile data 308 may include respective connection links indicating a user's connection to other users of the messaging system. The messaging system is configured to permit users, that are connected in the messaging system, to exchange text and multimedia messages and to initiate and accept video call sessions with each other. For example, the web calling system 208 is configured to generate a web calling UI that includes an area referred to as a contacts panel. The contact panel includes information identifying users that are connected to the user in the messaging system, indicating that these users can be engaged in a video call with the user.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a user device 102. The modified image is displayed on a screen of the user device 102 with the modifications. AR tools may also be used to apply modifications to stored content, such as video clips or still images stored in a gallery. In a user device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a user device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Process Flow and User Interfaces

Figure 4:
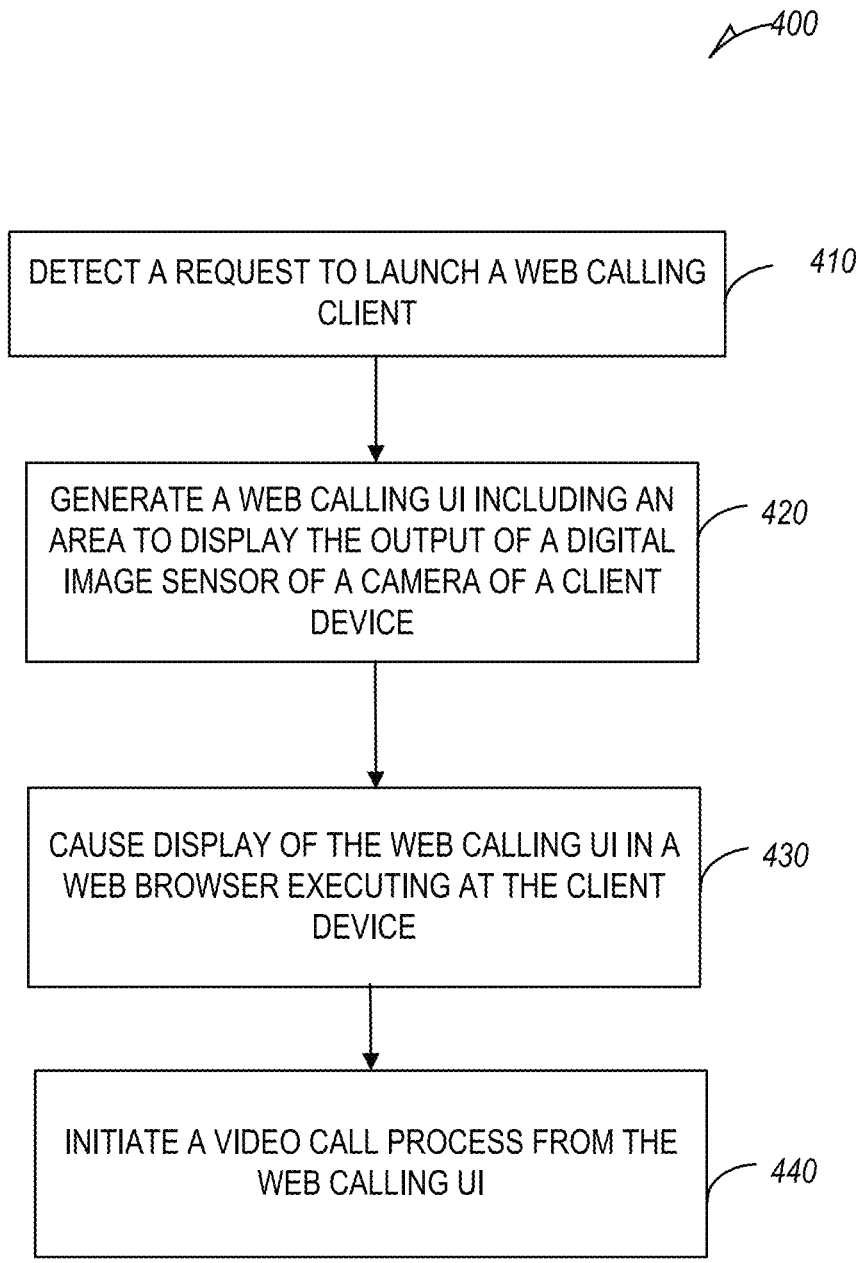
FIG. 4 is a flowchart of a method for enhancing users' experience of making and receiving video calls using a web browser, in accordance with some examples.

FIG. 4 is a flowchart of a method 400 for enhancing a users' experience of making and receiving video calls using a web browser, in accordance with some examples.

Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In one example, some or all processing logic resides at the user device 102 of FIG. 1 and/or at the messaging server system 108 of FIG. 1. The method 400 commences at operation 410, when the web calling system 208 of FIG. 2 detects or receives a request to launch a web calling client in a web browser at a user device. The detected request is associated with a user profile representing a user in the messaging system. In response to detecting of the request, the web calling system 208 generates a web calling UI at operation 420, and causes display of the web calling UI at the user device at operation 430. At operation 440, the web calling system 208 initiates a video call process from the web calling UI.

An example web calling UI, which is illustrated in FIG. 5, comprises a video feed area and a new call user-selectable element. The video feed area is to display an output of a digital image sensor of a camera of the user device. The new call user-selectable element is actionable to initiate a video call process in the web browser.

The web calling system 208 initiates a video call process by generating a new call UI in response to detecting activation of the new call user-selectable element. An example new call UI, which is illustrated in FIG. 7, includes the video feed area, a call recipient selection area comprising references to respective contacts that can be selected as invitees for a video call, and a start call user-selectable element actionable to initiate a video call session with one or more invitees from the invitees for the video call.

In some examples, the web calling UI includes a contacts panel that includes information identifying users or groups of users that can be engaged in a video call. In one example, the information identifying a user who can be engaged in a video call may be in the form of a reference to a further profile representing a further user in the messaging system.

The web calling system 208 may initiate a video call process in response to detecting that a cursor is positioned over the contacts panel (a hover action with respect to the reference to the further profile in the contacts panel), by causing display of a start call user-selectable element in a manner indicative of an association with the displayed reference. The start call user-selectable element is actionable to initiate a video call session with a user device associated with the further profile.

In some examples, the messaging system maintains an AR component configured to apply a modification to an area of a UI displayed on a computer screen, and the web calling system 208 is configured to permit a user to access the associated AR experience. In response to detecting an action, such as a hover action for example, with respect to the video feed area in the web calling UI, the web calling system 208 causes presentation of an AR user-selectable element actionable to apply the modification provided by the AR component to the video feed area, as shown in FIG. 6. The web calling system 208 may be configured to permit access to AR experiences provided by the messaging system from other UIs that include the video feed area.

Figure 10:
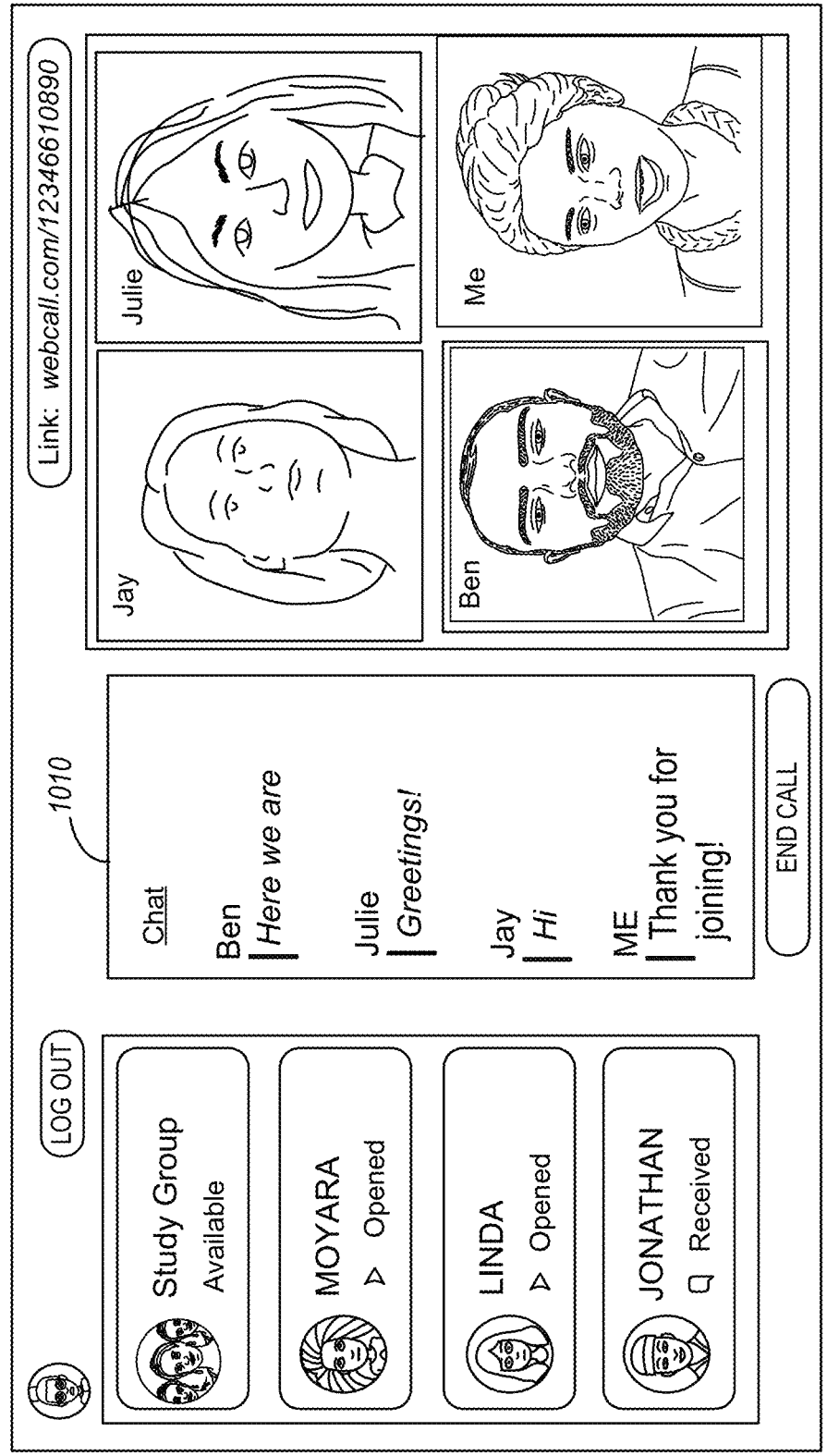
FIG. 10 illustrates a call session user interface with a chat panel, in accordance with some examples.

The initiating of a video call process results in the web calling system 208 generating of a call session UI, which is illustrated in FIGS. 9 and 10, which are described further below. The call session UI comprises outputs of respective digital image sensors of the cameras of user devices of the one or more invitees of the video call session, in addition to the output of the digital image sensor of the camera of the user device controlled by the user represented by the user profile associated with the request to launch the web calling client. The web calling system 208 is configured to generate the call session UI in response to detecting activation of the start call user-selectable element displayed in the new call UI and/or in response to detecting activation of the start call user-selectable displayed in a manner indicative of an association with the reference to the further profile displayed in the contacts panel of the web calling UI. In some examples, the call session UI includes a chat panel configured to facilitate text messaging between participants of the video call session. Any conversation information displayed in the chat panel is blurred in response to detecting that the foreground focus has been removed from the call session UI, thus obscuring information in the chat panel.

FIG. 5 is a diagram 500 that illustrates a web calling UI, in accordance with some examples. The web calling user UI includes an output of a digital image sensor of the camera of the user device in a video feed area 510, a contacts panel 520 that includes information identifying users that can be engaged in a video call, and a new call user-selectable element 530. The contacts panel 520 shows users identified as "MOYARA," "LINDA," and "JONATHAN," as well as a group "Study Group" that includes Ben, Julie, and Jay as participants. The new call user-selectable element 530 is actionable to initiate a video call process in the web browser.

FIG. 6 is a diagram 600 that illustrates a web calling UI that permits user access to an augmented reality experience, in accordance with some examples. The web calling UI is shown as including a user-selectable element 610 actionable to apply a modification provided by an associated AR component to the video feed area 620. In this example, the modification is a string of hearts 630 that appears in the video feed area 620, in addition to the output of the digital image sensor of a camera, which, in this example, is the image of the person positioned in front of the associated user device.

FIG. 7 is a diagram 700 that illustrates a new call UI, in accordance with some examples. The new call UI includes the video feed area 710, a call recipient selection area 720 and a start call user-selectable element 730. The call recipient selection area 720 comprises references to respective contacts that can be selected as invitees for a video call, by using checkboxes, for example. A video call session with the selected contacts can be initiated by engaging the start call user-selectable element 730.

In some examples, a video call session may be initiated directly from the web calling UI, as illustrated in FIG. 8. FIG. 8 is a diagram 800 that illustrates surfacing a start call user-selectable element from the web calling user interface, in accordance with some examples. The web calling UI shown in FIG. 8 includes a contacts panel area 810 that displays references to users or groups of users. As mentioned above, the web calling system may be configured to detect an action with respect to a reference to a contact in the contacts panel area and, in response, cause display of a call user-selectable element in proximity to the reference. FIG. 8 illustrates a hover action over "MOYARA" reference in the contacts panel area 810 by a cursor symbol 820 and a resulting call user-selectable element 830 in proximity to the "MOYARA" reference. Activating the call user-selectable element 830 causes initiating a video call session with a user identified in the messaging system as Moyara.

FIG. 9 is a diagram 900 that illustrates a call session UI, in accordance with some examples. The call session UI comprises, in area 910, outputs of respective digital image sensors of the cameras of user devices of the one or more invitees of the video call session, in addition to the output of the digital image sensor of the camera of the user device controlled by the user represented by the user profile associated with the request to launch the web calling client. The call session UI also comprises a link 920 actionable to invite a further participant to the video call session, a user-selectable element 930 actionable to end the video call session, and a user-selectable-element 940 actionable to logout the user from the communication session with the messaging system.

FIG. 10 is a diagram 1000 that illustrates a call session user interface that includes a chat panel 1010, in accordance with some examples. The chat panel 1010 is configured to facilitate text messaging between participants of the video call session. In this example, the video call session is with users included in the group "Study Group"—users identified as Ben, Julie, and Jay. Any conversation information displayed in the chat panel 1010 is blurred in response to detecting that the foreground focus has been removed from the call session UI, thus obscuring information in the chat panel.

Figure 11:
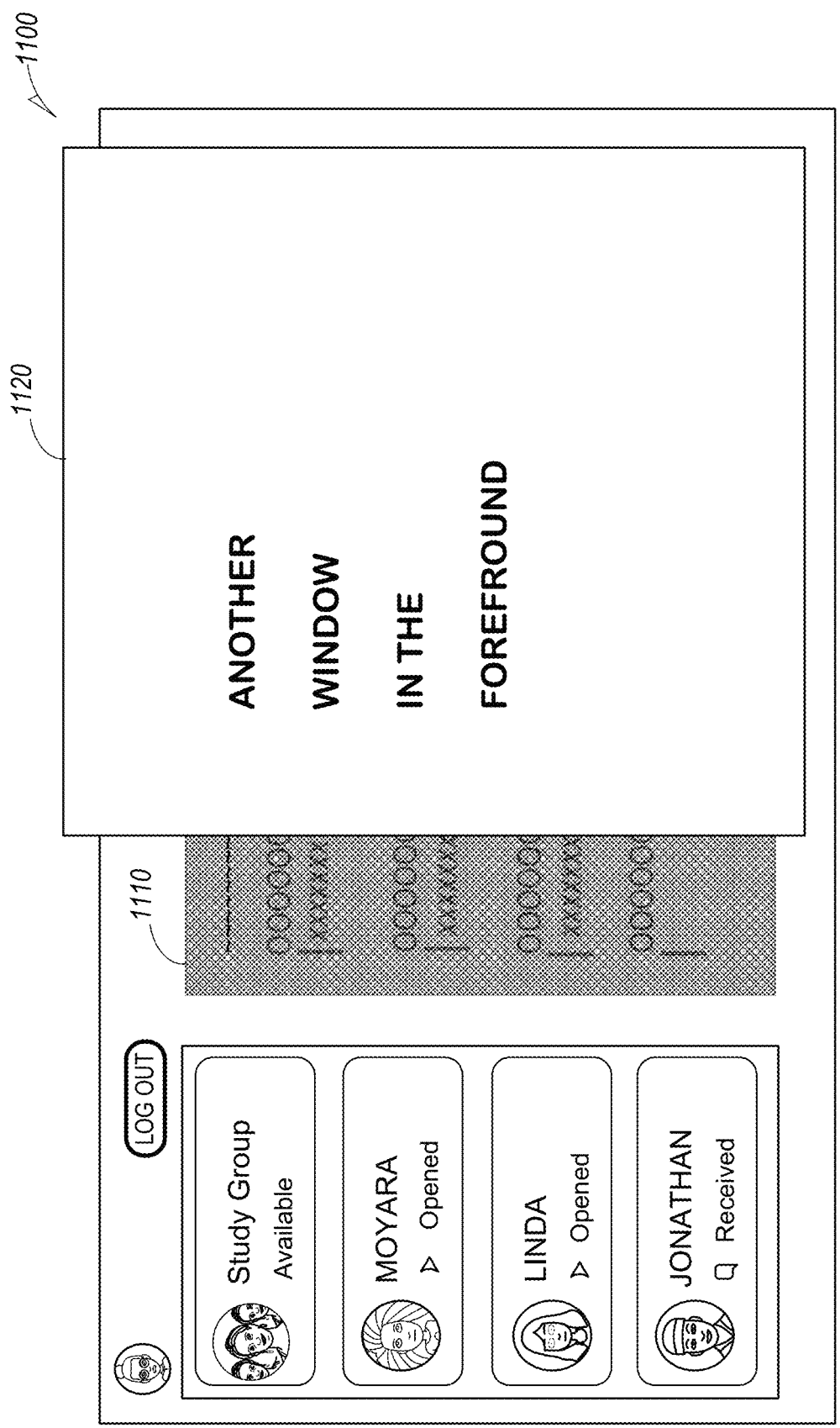
FIG. 11 illustrates blurring of the chat panel in the call session user interface, in accordance with some examples.

FIG. 11 is a diagram 1100 that illustrates blurring of a chat panel 1110 in the call session user interface, in accordance with some examples, in response to detecting that the foreground focus has been removed from the call session UI. A chat panel 1110 in FIG. 11 is shown as blurred, while a window 1120 is in the foreground focus.

Figure 13:
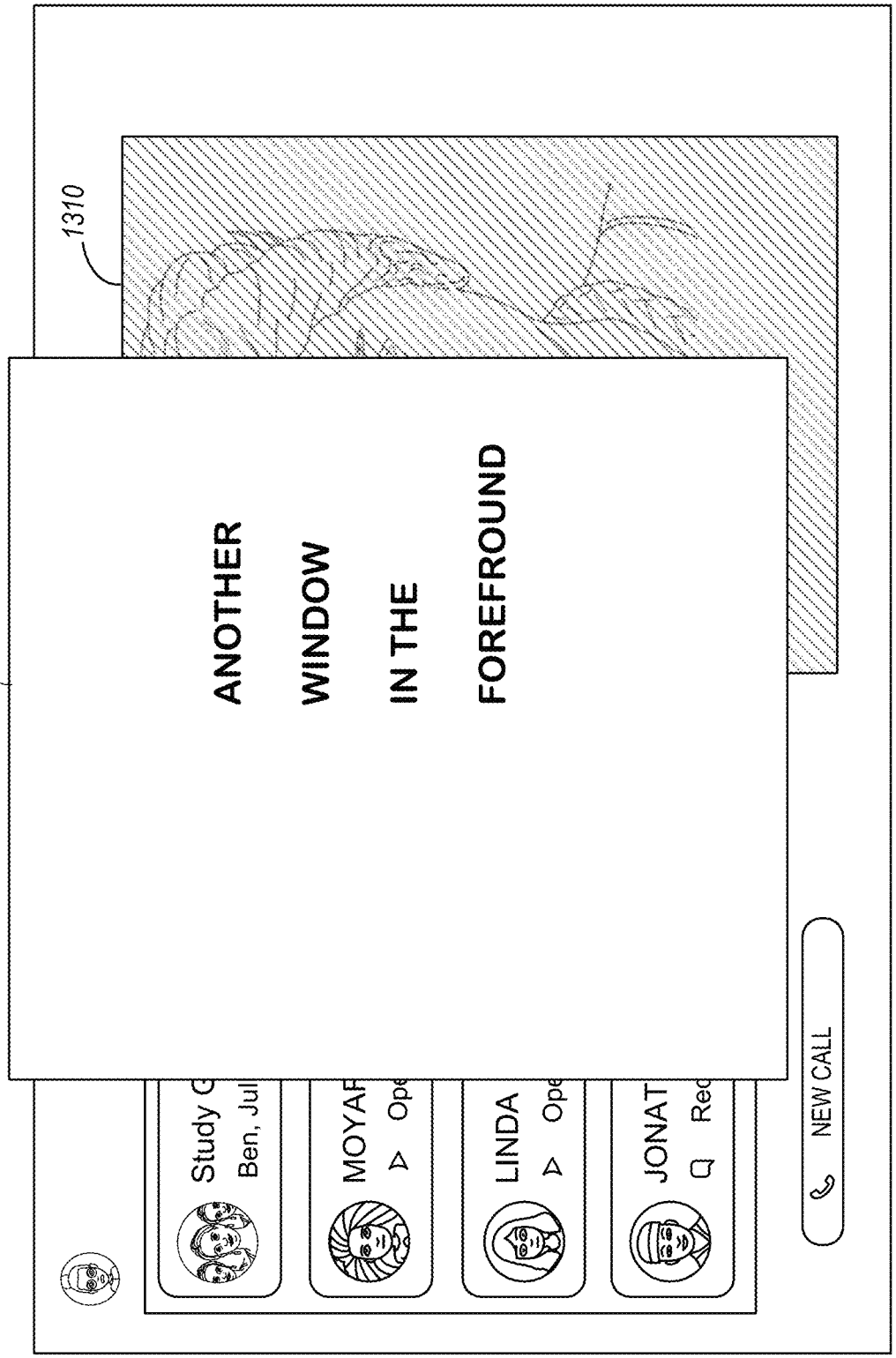
FIG. 13 illustrates blurring of the video feed area in the web calling UI, in accordance with some examples.

FIG. 13 is a diagram 1300 that illustrates the web calling UI, in which a video feed area 1310 is blurred in response to detecting that the foreground focus has been removed from the web calling UI and replaced by a window 1320.

Figure 14:
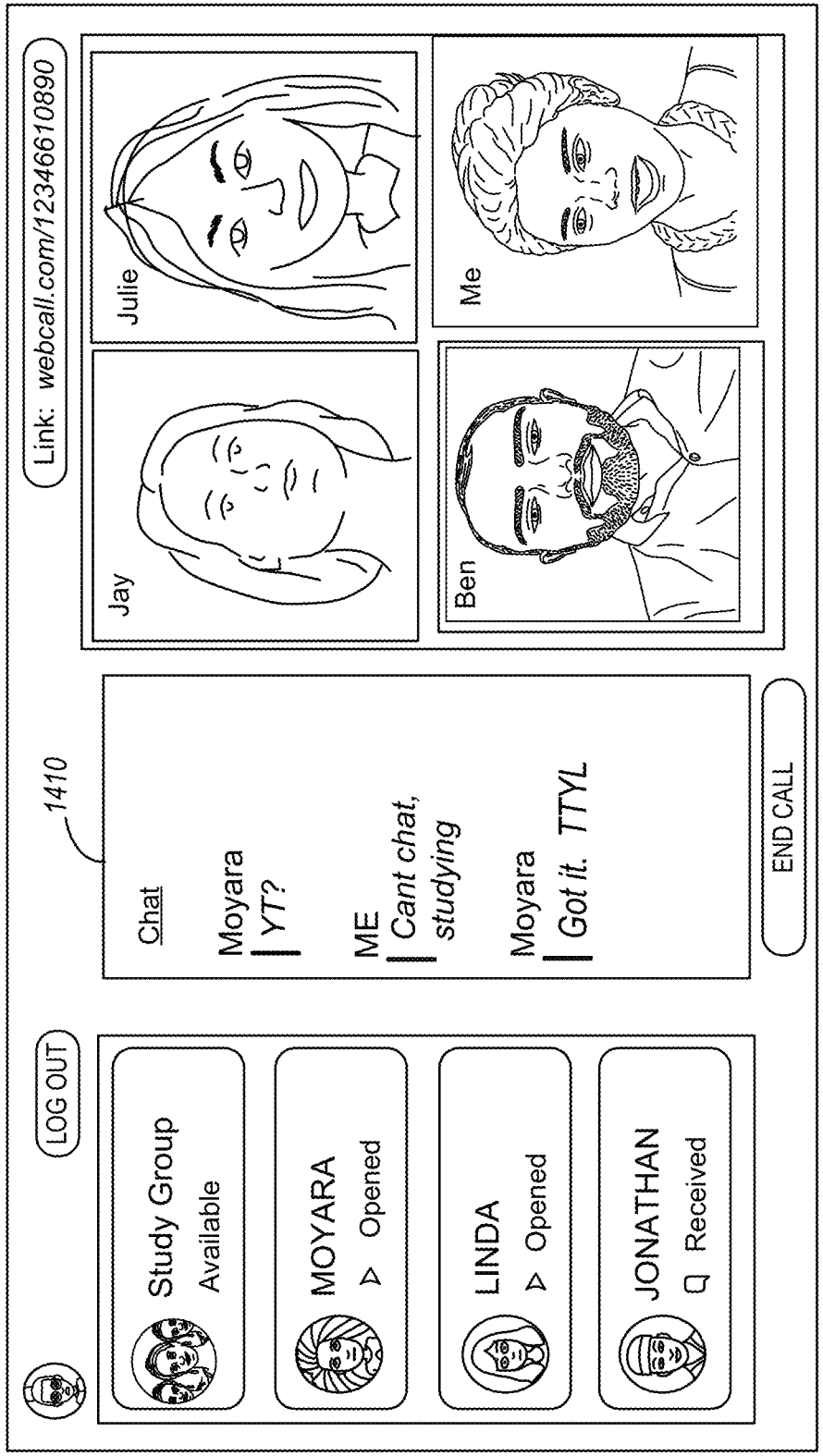
FIG. 14 illustrates a call session user interface with a chat panel, in which a chat participant is different from any of the video call participants, in accordance with some examples.

FIG. 14 is a diagram 1400 that illustrates a call session UI that includes a chat panel 1410, in which a chat participant—Moyara—is not a participant of the on-going video call.

Machine Architecture

Figure 12:
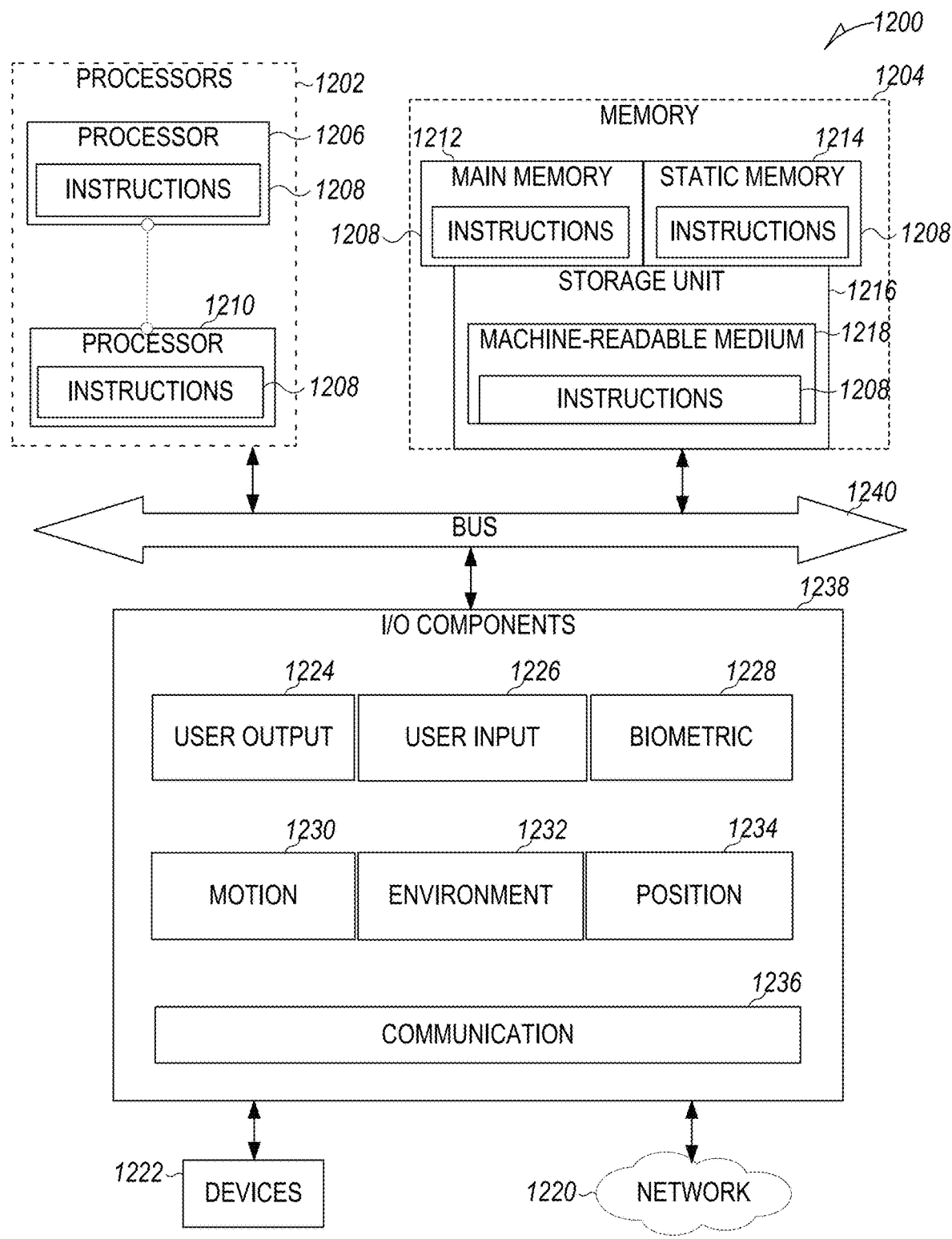
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein. The machine 1200, for example, may comprise the user device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1202, memory 1204, and input/output I/O components 1238, which may be configured to communicate with each other via a bus 1240. In an example, the processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single-core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1240. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the Processor's cache memory), or any suitable combination thereof, during execution thereof by the machine 1200.

The I/O components 1238 may include a wide variety of components to receive input, provide output, produce output, transmit information, exchange information, capture measurements, and so on. The specific I/O components 1238 that are included in a particular machine will depend on the type of machine. For example, portable machines such as mobile phones may include a touch input device or other such input mechanisms, while a headless server machine will likely not include such a touch input device. It will be appreciated that the I/O components 1238 may include many other components that are not shown in FIG. 12. In various examples, the I/O components 1238 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1238 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user device 102 may have a camera system comprising, for example, front cameras on a front surface of the user device 102 and rear cameras on a rear surface of the user device 102. The front cameras may, for example, be used to capture still images and video of a user of the user device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user device 102 may also include a 360° camera for capturing 360° photographs and videos.

Further, the camera system of a user device 102 may include dual rear cameras (e.g., a primary camera as well as a depth-sensing camera), or even triple, quad or penta rear camera configurations on the front and rear sides of the user device 102. These multiple cameras systems may include a wide camera, an ultra-wide camera, a telephoto camera, a macro camera and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1238 further include communication components 1236 operable to couple the machine 1200 to a network 1220 or devices 1222 via respective coupling or connections. For example, the communication components 1236 may include a network interface Component or another suitable device to interface with the network 1220. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1212, static memory 1214, and memory of the processors 1202) and storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1236) and using any one of several well-known transfer protocols (e.g., hypertext transfer protocol (HTTP)). Similarly, the instructions 1208 may be transmitted or received using a transmission medium via a coupling (e.g., a peer-to-peer coupling) to the devices 1222.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"User device" refers to any machine that interfaces to a communications network to obtain resources from one or more server systems or other user devices. A user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1202 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   in a messaging system to exchange data, detecting a request to launch a web calling client in a web browser at a user device, wherein the request is associated with a user profile representing a user in the messaging system;
   in response to the request, generating a web calling user interface (UI) comprising:
   a video feed area to display an output of a digital image sensor of a camera of the user device;
   a new call user-selectable element actionable to generate a new call UI,
   causing display of the web calling UI at the user device;
   in response to detecting selection of the new call user-selectable element of the web calling UI, causing display of a new call UI, the new call UI comprising:
   a start call user-selectable element actionable to initiate a video call process in the web browser;
   in response to user activation of the start call user-selectable element:
   causing display of a call session UI, the call session UI at the user device, the call session UI comprising an output of a digital image sensor of a camera of a further user device associated with an invitee and a chat panel to facilitate text messaging between the invitee and the user;
   initiating a video call session between the user device and one or more invitee devices; and
   in response to detecting a foreground focus removed from the call session UI, automatically obscuring the chat panel within the call session UI to obscure conversation information in the chat panel.

2. The method of claim 1, wherein the messaging system maintains an augmented reality (AR) component configured to apply a modification to an area of a UI displayed on a computer screen, the method further comprising:
   detecting an action with respect to the video feed area; and
   in response to the detecting of the action, causing presentation of an AR user-selectable element actionable to apply the modification to the video feed area.

3. The method of claim 2, wherein the action with respect to the video feed area is a hover action.

4. The method of claim 1, further comprising wherein the new call UI comprises:
   a video feed area, and
   a call recipient selection area comprising references to respective contacts that can be selected as invitees for a video call.

5. The method of claim 1, wherein the call session UI comprises a link actionable to invite a further participant to the video call session.

6. The method of claim 1, wherein the web calling UI comprises a contacts panel area including a reference to a further profile representing a further user in the messaging system.

7. The method of claim 6, comprising:
detecting an action with respect to the reference to the further profile in the contacts panel area; and
in response to the detecting, causing display of a start call user-selectable element actionable to initiate a video call session with a user device associated with the further profile.

8. The method of claim 1, wherein the user device is a desktop computer.

9. A system comprising:
one or more processors; and
a non-transitory computer readable storage medium comprising instructions that when executed by the one or processors cause the one or more processors to perform operations comprising:
in a messaging system to exchange data, detecting a request to launch a web calling client in a web browser at a user device, wherein the request is associated with a user profile representing a user in the messaging system;
in response to the request, generating a web calling user interface (UI) comprising:
a video feed area to display an output of a digital image sensor of a camera of the user device;
a new call user-selectable element actionable to generate a new call UI,
causing display of the web calling UI at the user device;
in response to detecting selection of the new call user-selectable element of the web calling UI, causing display of a new call UI, the new call UI comprising:
a start call user-selectable element actionable to initiate a video call process in the web browser;
in response to user activation of the start call user-selectable element:
causing display of a call session UI, the call session UI at the user device, the call session UI comprising an output of a digital image sensor of a camera of a further user device associated with an invitee and a chat panel to facilitate text messaging between the invitee and the user;
initiating a video call session between the user device and one or more invitee devices; and
in response to detecting a foreground focus removed from the call session UI, automatically obscuring the chat panel within the call session UI to obscure conversation information in the chat panel.

10. The system of claim 9, wherein the messaging system maintains an augmented reality (AR) component configured to apply a modification to an area of a UI displayed on a computer screen, wherein the operations caused by instructions executed by the one or processors further include:
detecting an action with respect to the video feed area; and
in response to the detecting of the action, causing presentation of an AR user-selectable element actionable to apply the modification to the video feed area.

11. The system of claim 10, wherein the action with respect to the video feed area is a hover action.

12. The method of claim 1, further comprising wherein the new call UI comprises:
a video feed area, and
a call recipient selection area comprising references to respective contacts that can be selected as invitees for a video call.

13. The system of claim 9, wherein the call session UI comprises a link actionable to invite a further participant to the video call session.

14. The system of claim 9, wherein the web calling UI comprises a contacts panel area including a reference to a further profile representing a further user in the messaging system.

15. The system of claim 14, wherein the operations caused by instructions executed by the one or processors further include:
detecting an action with respect to the reference to the further profile in the contacts panel area; and
in response to the detecting, causing display of a start call user-selectable element actionable to initiate a video call session with a user device associated with the further profile.

16. A machine-readable non-transitory storage medium having instruction data executable by a machine to cause the machine to perform operations comprising:
in a messaging system to exchange data, detecting a request to launch a web calling client in a web browser at a user device, wherein the request is associated with a user profile representing a user in the messaging system;
in response to the request, generating a web calling user interface (UI) comprising:
a video feed area to display an output of a digital image sensor of a camera of the user device;
a new call user-selectable element actionable to generate a new call UI,
causing display of the web calling UI at the user device;
in response to detecting selection of the new call user-selectable element of the web calling UI, causing display of a new call UI, the new call UI comprising:
a start call user-selectable element actionable to initiate a video call process in the web browser;
in response to user activation of the start call user-selectable element:
causing display of a call session UI, the call session UI at the user device, the call session UI comprising an output of a digital image sensor of a camera of a further user device associated with an invitee and a chat panel to facilitate text messaging between the invitee and the user;
initiating a video call session between the user device and one or more invitee devices; and
in response to detecting a foreground focus removed from the call session UI, automatically obscuring the chat panel within the call session UI to obscure conversation information in the chat panel.

* * * * *